United States Patent
Olson

(10) Patent No.: US 11,440,676 B2
(45) Date of Patent: Sep. 13, 2022

(54) RECORDING AND REAL-TIME TRANSMISSION OF IN-FLIGHT CONDITION OF AIRCRAFT COCKPIT TO GROUND SERVICES

(71) Applicant: Theia Group, Incorporated, Philadelphia, PA (US)

(72) Inventor: Erlend Olson, Newport Beach, CA (US)

(73) Assignee: Theia Group, Incorporated, Philadelphia, PA (US)

(*) Notice: Subject to any disclaimer, the term of this patent is extended or adjusted under 35 U.S.C. 154(b) by 424 days.

(21) Appl. No.: 16/608,167

(22) PCT Filed: Apr. 20, 2018

(86) PCT No.: PCT/US2018/028571
§ 371 (c)(1),
(2) Date: Oct. 24, 2019

(87) PCT Pub. No.: WO2018/200329
PCT Pub. Date: Nov. 1, 2018

(65) Prior Publication Data
US 2021/0101696 A1 Apr. 8, 2021

Related U.S. Application Data

(60) Provisional application No. 62/489,223, filed on Apr. 24, 2017.

(51) Int. Cl.
*B64D 45/00* (2006.01)
*H04W 4/42* (2018.01)
(Continued)

(52) U.S. Cl.
CPC ............ *B64D 45/00* (2013.01); *B64D 47/08* (2013.01); *H04B 7/1851* (2013.01); *B64D 2045/0065* (2013.01); *B64D 2045/0085* (2013.01)

(58) Field of Classification Search
CPC .... B64D 2045/0065; B64D 2045/0085; B64D 45/00; B64D 45/0053; B64D 47/08;
(Continued)

(56) References Cited

U.S. PATENT DOCUMENTS 4,568,972 A 2/1986 Arents
5,499,295 A 3/1996 Cooper
(Continued)

FOREIGN PATENT DOCUMENTS

CA 2433480 A1 1/2004
EA 1419964 A1 5/2004
(Continued)

OTHER PUBLICATIONS

Klosterman. "Vision helps preform predictive maintenance." Vision Systems Design, Apr. 11, 2016, pp. 1-8.

*Primary Examiner* — Philip Sobutka
(74) *Attorney, Agent, or Firm* — Bonini IP Law, LLC; Frank J. Bonini, Jr.

(57) ABSTRACT

A system, method and device for monitoring an aircraft, including activity taking place within an aircraft and conditions of the aircraft, where one or more a percepting component such as a camera, microphone, or other sensor, is situated at a location within the aircraft from which information may be ascertained. Preferably the component is disguised within the surfaces or instrumentation of the aircraft. The percepting component is connected with a communication mechanism to transmit communications from the system resident within the aircraft to a grounds
(Continued)

portion of the system through a communication link, such as a satellite communication link. The system may process the information corresponding with the aircraft condition or activity and generate alerts when a trigger is met or exceeded. The system components on the aircraft may monitor conditions and activity without using or interfering with the aircraft instrumentation, the system using only the aircraft power.

18 Claims, 2 Drawing Sheets

(51) Int. Cl.
*H04B 7/185* (2006.01)
*B64D 47/08* (2006.01)

(58) Field of Classification Search
CPC .............. H04B 7/1851; H04B 7/18502; H04B 7/18506; H04B 7/18508; H04W 4/42; H04W 4/44
See application file for complete search history.

(56) References Cited

U.S. PATENT DOCUMENTS

| | | | |
|---|---|---|---|
| 5,673,331 | A | 9/1997 | Lewis et al. |
| 5,805,813 | A | 9/1998 | Schweitzer, III |
| 5,870,140 | A | 2/1999 | Gillberry |
| 6,058,478 | A | 5/2000 | Davis |
| 6,208,266 | B1 | 3/2001 | Lyons et al. |
| 6,278,913 | B1 | 8/2001 | Jiang |
| 6,961,445 | B1 | 11/2005 | Jensen et al. |
| 7,168,357 | B2 | 1/2007 | Hodgkinson |
| 7,697,028 | B1 | 4/2010 | Johnson |
| 7,836,299 | B2 | 11/2010 | England et al. |
| 7,908,483 | B2 | 3/2011 | Iliev et al. |
| 8,375,221 | B1 | 2/2013 | Thom et al. |
| 8,589,994 | B2 * | 11/2013 | Monroe ............. H04B 7/18504 340/963 |
| 8,787,904 | B1 | 7/2014 | Hayes et al. |
| 8,838,289 | B2 | 9/2014 | Margolin |
| 8,866,909 | B2 | 10/2014 | Bramoulle |
| 8,924,044 | B1 | 12/2014 | Wang et al. |
| 9,266,610 | B2 | 2/2016 | Knapp et al. |
| 9,540,121 | B2 | 1/2017 | Byers et al. |
| 9,542,850 | B2 | 1/2017 | Kantor et al. |
| 9,546,002 | B1 | 1/2017 | Azcuenaga et al. |
| 9,547,985 | B2 | 1/2017 | Tuukkanen |
| 9,621,254 | B2 | 4/2017 | Chang |
| 9,681,320 | B2 | 6/2017 | Johnson et al. |
| 9,874,874 | B2 | 1/2018 | Bernhardt et al. |
| 10,025,303 | B1 | 7/2018 | Annan et al. |
| 2002/0004695 | A1 | 1/2002 | Glenn et al. |
| 2003/0048202 | A1 | 3/2003 | Francois |
| 2003/0065428 | A1 * | 4/2003 | Mendelson .......... G05D 1/0055 701/9 |
| 2003/0093187 | A1 * | 5/2003 | Walker ............... B64D 45/0059 701/1 |
| 2003/0138146 | A1 | 7/2003 | Johnson et al. |
| 2003/0158943 | A1 | 8/2003 | Kim et al. |
| 2004/0095466 | A1 | 5/2004 | Galasso |
| 2005/0246295 | A1 | 11/2005 | Cameron |
| 2005/0258943 | A1 | 11/2005 | Mian et al. |
| 2006/0022845 | A1 * | 2/2006 | Fischer ................. G08G 5/045 340/945 |
| 2006/0040660 | A1 | 2/2006 | Cruz et al. |
| 2006/0229070 | A1 | 10/2006 | De La Chapelle et al. |
| 2007/0055434 | A1 * | 3/2007 | Kohlmann ............. B64C 13/20 701/100 |
| 2007/0130599 | A1 | 6/2007 | Monroe |
| 2007/0236366 | A1 * | 10/2007 | Gur ....................... G06V 20/59 340/945 |
| 2008/0089666 | A1 | 4/2008 | Aman |
| 2008/0102814 | A1 | 5/2008 | Chari et al. |
| 2009/0251542 | A1 | 10/2009 | Cohen et al. |
| 2009/0322884 | A1 | 12/2009 | Bolick et al. |
| 2010/0191754 | A1 | 7/2010 | Baker et al. |
| 2011/0149067 | A1 | 6/2011 | Lewis et al. |
| 2011/0212695 | A1 | 9/2011 | Wild et al. |
| 2013/0070099 | A1 | 3/2013 | Gellebonia et al. |
| 2013/0115050 | A1 | 5/2013 | Twerdochlib |
| 2014/0233412 | A1 | 2/2014 | Mishra et al. |
| 2014/0241239 | A1 | 8/2014 | Chang |
| 2014/0347482 | A1 | 11/2014 | Weinmann et al. |
| 2015/0003665 | A1 | 1/2015 | Kumar |
| 2015/0109136 | A1 | 4/2015 | Capozella et al. |
| 2015/0147976 | A1 | 5/2015 | Wang et al. |
| 2015/0171956 | A1 | 6/2015 | Wang et al. |
| 2015/0236778 | A1 | 8/2015 | Jalali |
| 2016/0050011 | A1 | 2/2016 | Frolov et al. |
| 2016/0075443 | A1 | 3/2016 | Schmutz et al. |
| 2016/0086031 | A1 | 3/2016 | Shigeno |
| 2016/0086034 | A1 | 3/2016 | Kennedy et al. |
| 2016/0104046 | A1 | 4/2016 | Doettling et al. |
| 2016/0105233 | A1 | 4/2016 | Jalali |
| 2016/0109263 | A1 | 4/2016 | Dubs |
| 2016/0176538 | A1 * | 6/2016 | Bekanich ............... G07C 5/085 701/14 |
| 2016/0314367 | A1 | 10/2016 | Chmiel et al. |
| 2017/0088048 | A1 | 3/2017 | Iwamoto |
| 2017/0116725 | A1 | 4/2017 | Stuart et al. |
| 2017/0163944 | A1 | 6/2017 | Jeong |
| 2017/0169593 | A1 | 6/2017 | Leigh |
| 2017/0249731 | A1 | 8/2017 | Van Gorp et al. |
| 2018/0005044 | A1 | 1/2018 | Olson |
| 2018/0253619 | A1 | 9/2018 | Petruk |

FOREIGN PATENT DOCUMENTS

| | | |
|---|---|---|
| EP | 1724195 A3 | 11/2006 |
| RU | 43424 U1 | 10/2005 |
| RU | 2550887 C2 | 5/2015 |
| WO | 2016160501 A1 | 10/2016 |
| WO | 2017210330 A1 | 7/2017 |

* cited by examiner

RECORDING AND REAL-TIME TRANSMISSION OF IN-FLIGHT CONDITION OF AIRCRAFT COCKPIT TO GROUND SERVICES

BACKGROUND OF THE INVENTION

1. Field of the Invention

A system, method and device for aircraft monitoring and flight deck or cockpit recording, and more particularly, a system that may be implemented to ascertain real-time information about events taking place within monitored areas of an aircraft.

2. Brief Description of the Related Art

The current systems for aircraft monitoring and flight deck or cockpit recording are inadequate in many respects. For example, if an airliner crashes, the only way to retrieve reliable data as to the cause of the crash or mishap is to retrieve the so-called black-box flight recorder. Many smaller aircraft do not have such flight recorders, making reconstructing the events leading up to a mishap difficult for investigators, insurance companies and safety regulators. In addition, sometimes it is extremely difficult to recover an aircraft flight recorder, and sometimes they are never recovered at all. For example, Air France Flight 447 went into the Atlantic Ocean and it was nearly two years before the flight recorders were recovered. By way of another example, Malaysian Airlines Flight 370 presumably crashed into the Indian Ocean, and more than two years later, still no wreckage or flight recorders have yet been recovered. In fact there are presently on average of over 400 aircraft incidents per year resulting in one or more deaths, many of them in smaller aircraft with no flight recorders at all.

Even when a flight recorder is recovered, it does not necessarily provide the entire information set as to the activities leading up to the event or mishap. For example, many flight recorders record the voices of the pilots in the cockpit, but they do not record the image of the pilots, what they are doing, nor even an indication of whether they are present on the flight deck or even conscious, such as the situation which happened with Helios Airways Flight 522. In that flight, the entire occupancy was incapacitated by decompression in the aircraft at altitude, and military jets had to be scrambled to verify visually what had happened, since there were no communications from the aircraft, and no means to obtain a picture of the flight deck to determine the crew's condition.

Furthermore, many crashes are the result of pilot error or misunderstanding of instruments or flight conditions. In such situations, it is possible and even likely that an independent flight expert or artificial intelligence flight system could be of material assistance in preventing a mishap or crash, if a means to insure that in an emergency flight situation, such resources were made available to the pilots. Even experienced professional pilots can make simple mistakes that could be corrected quickly with objective independent suggestions. For example, Air France Flight 447 spent over 3 minutes in a nose-up stall, entirely under the control of the pilots, with multiple indicators on the instrument panel indicating the elements of a stall condition, until it crashed into the ocean in a decent from 38,000 feet. The stall and ultimate crash could have easily been prevented had at some point in those 3 minutes, the pilots simply recognized the state of the aircraft as indicated by some of their instruments, pointed the nose down, and regained sufficient air flow over the wings to induce the aircraft into flight again.

In other situations, where there is possible breach of the flight deck by hijackers, often little is understood about an aircraft situation unless the hijackers choose to communicate. For example, in the Sep. 11, 2001 attacks on the US, a significant period of time passed before ground controllers realized the gravity of the situation, since the attackers were not communicating anything over air traffic control frequencies. In fact several individuals knew the exact situation in the aircraft before airliner executives or air traffic control officials knew, based on passenger-to-ground calls. Still today, there is no system for ground controllers to independently view the status of an airliner flight deck.

A similar situation exists with respect to private aircraft. Private aircraft have many more accidents per year than airliners, and are less equipped to record incidents or provide for assistance in the case of in-flight emergencies.

The problems cited above are exacerbated by the fact that installing anything into an aircraft that might obtain readings from instruments or other aircraft-installed systems requires lengthy and expensive certification processes. Installing anything in an aircraft which in any way connects to instruments or existing aircraft systems typically violates the aircraft's airworthiness certificate.

What is needed is a system which is completely independent of an aircraft's existing avionics and systems, but which can nevertheless monitor the major elements affecting an aircraft and its operation.

SUMMARY OF THE INVENTION

A system, method and device are provided for monitoring an aircraft. The system, method and device are configured to monitor and obtain information from the major elements affecting an aircraft and its operation. The system is configured to obtain the information independently of and without being tied into the existing avionics and aircraft operational and guidance components.

The system, method and devices obtain information about the aircraft, which may include, for example, but not be limited to, information obtained by monitoring the aircraft's avionics and instruments, both audio and video of the cockpit in order to determine the activities of the pilots, including their presence, as well as sounds in the cockpit, such as audible alerts, pilots or others' conversations in the cockpit, and view through the cockpit windows to provide some indication of outside conditions or weather in which the aircraft is operating.

In addition, the present system, method and device, rather than merely recording the monitored information, such as, for example, the aforementioned elements, to a recording device (which has to be found intact and undamaged in order to ascertain its contents), the system may transmit the aforementioned elements wirelessly to a location, facility, airline operations center or other suitable ground-system during flight. According to some embodiments, the transmission may occur selectively when activated under certain conditions in flight or by pilots.

In addition, according to some embodiments, the system is configured to communicate with the pilot of the aircraft when warranted, which preferably is done independent of whether or not the regular radios of the aircraft are operable, or whether or not the aircraft is out of range of air traffic control or other ground transceivers.

The present invention supplies the above capabilities and more. Although features may be disclosed in a particular embodiment, embodiments of the invention may implement one or more or combinations of the features disclosed herein.

BRIEF DESCRIPTION OF THE DRAWING FIGURES

DETAILED DESCRIPTION OF THE INVENTION

Figure 1:
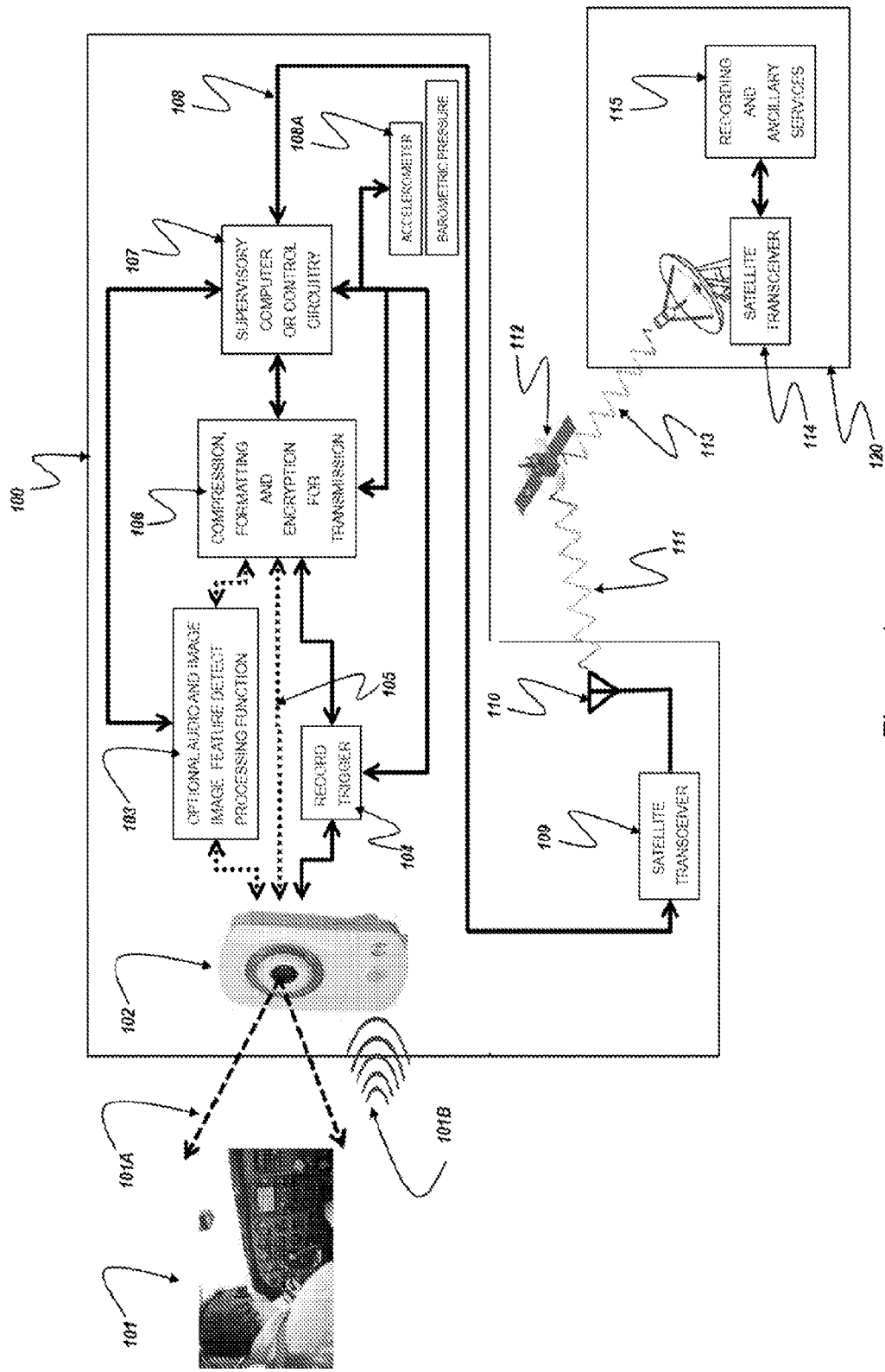
FIG. 1 is a schematic illustration depicting an exemplary embodiment of the system, according to the invention, showing a device for imaging and associated components for managing information.

The fundamental invention is disclosed in FIG. 1, and further described herein, along with descriptions of options which may be amended to the elements of the invention without limitation or departing from the scope. For the purposes of this disclosure, the invention is called the real-time flight recorder system (RFRS).

Figure 2A:
FIG. 2A is a perspective view of the cockpit, showing two pilots seated therein, as viewed from the rear of the cockpit looking forward.
Figure 2B:
FIG. 2B is a perspective view of the cockpit depicted in FIG. 1, showing a pilot seated therein.

First, referring to FIG. 1, an exemplary embodiment of a system according to the invention is illustrated. The RFRS, in the embodiment depicted, is shown including a camera 102 which typically has a wide angle lens 101A, with a microphone and speaker 101B. The microphone speaker 101B and camera 102 may be contained within a single housing as indicated in FIG. 1, or, according to alternate embodiments, may be separately mounted. Preferably, the camera, speaker and microphone are mounted in the cockpit 101 in a location which does not interfere with the operation of the aircraft, but which nevertheless provides a view of the cockpit 101 and pilots, as shown for example, without limitation, in FIGS. 2A and 2B, where cockpits 201 and 101 are depicted, respectively. For example, as depicted in FIGS. 2A and 2B, the camera ascertains an image of the cockpit view where a number of the aircraft's instruments, which are operative during flight, are imaged and recorded. The image may be transmitted to the ground portion 120 during flight (or after the flight), to provide information about the aircraft's condition during its flight. The information may comprise real time information. According to some alternative embodiments, the information obtained from components (e.g., from cameras and sensors) may be processed by the aircraft portion 100 of the RFRS, and processed data obtained from the image or sensor information may be transmitted from the aircraft portion 100 to the ground portion 120. The component 115 may be configured with software or other artificial intelligence to identify or detect conditions of the aircraft (based on the camera and/or other sensors) and provide alerts when the condition meets or exceeds a threshold. In addition, the single camera 102 indicated in FIG. 1 may in fact be two or more cameras in order to provide complete coverage of a cockpit, without departing from the scope of the invention disclosed herein. In addition, as well known to those practiced in the art, the cameras and microphone and speaker may be of the miniature type, so that their location may be made to be hidden or innocuous or disguised to appear part of other instruments or switches, and therefore not readily recognizable by a hijacker or other unauthorized entrant to the cockpit. The camera 102 and microphone are set to record images and audio in the cockpit 101, primarily during emergencies, but may be set to record at any time, including for the complete duration of a flight, or for training purposes. The recording devices are connected to a system 100 which resides in the aircraft, but other than a power connection (where the system is configured or installed to receive power from the aircraft), is otherwise in no way connected to any other aircraft systems, and is therefore easy to install in aircraft which are already in operation and/or without affecting the aircraft's airworthiness certificate.

In addition to the camera 102 and microphone and speaker 101B, the aircraft portion 100 of the RFRS includes means to automatically record and/or transmit images, sound bites or full video when certain sounds or images are noticed by the system. Listening circuitry may be provided. For example, the listening circuitry may process inputs from the camera 102, microphone, or other detecting component (such as, for example, a sensor, which may be included as part of the camera 102, or which may be separately provided an associated with the system components). The optional recording function 102 and recording trigger function 104 and optional continuous full video and audio 105 are compressed, formatted and encrypted 106 in preparation for optional transmission to the ground portion of the RFRS 120 via link 108 to a satellite radio transceiver 109 with suitable antenna 110. According to some embodiments, the ground portion 120 may be configured to include a satellite transceiver 114 for transmitting and receiving communications through a satellite (such as, for example, the satellite link represented by the satellite 112 and links 111,113 depicted in FIG. 1). The aircraft portion of the system 100 may also include sensors separate from those of the aircraft, including optionally a barometric pressure sensor and accelerometer sensor and an attitude sensor (not shown). The aircraft portion 100 of the RFRS is shown containing a supervisory computer or control circuitry means 107. According to some embodiments of the invention, all of the functional elements of the aircraft portion 100 of the RFRS may be contained within a single computer or programmable circuit means, as opposed to being separable functions, without departing from the scope. According to other embodiments, the functional elements may be provided in one or more separate arrangements, for example, where the camera 102 and/or other sensors that collect or provide information, are provided separately from the operation circuitry or processing components, and transmission components.

According to some embodiments, the system components may be provided together in a housing. Embodiments may be configured where one or more components, such as, for example, a camera lens, sensor, or microphone, may be located separate from the housing and disguised among the cockpit instruments, switches, panels and/or other interior components.

The component or components which are not situated within the housing preferably are connected to the housing or one or more other components within the housing. This may be done through a suitable connection, which may be wired or wireless (where the transmission would not interfere with aircraft instrumentation).

In operation, various sensors may operate individually or in concert to register conditions to the supervisory means which cause the images and audio or video and audio to be recorded and optionally immediately transmitted, or saved for later transmission. The trigger points or combinations can be set prior to installation by a program, prior to a single flight by a program, or on a real-time basis by a program, and that program can be optionally updated locally or via the radio link from another location. For example, a recording can be started if the RFRS detects a certain indicator light on the instrument panel, or detects the audio of a warning from the instruments, or detects unusual sounds. The audio can also be set to trigger a recording if it detects a certain word or sequence said by the pilot, such as "mayday" or "help" or a sequence of numbers known only to the pilots but not to unauthorized persons, and in this way the recording and transmission system may be triggered by the pilot during emergencies with minimal additional workload.

In addition, the RFRS portion 100 on the aircraft may be set to continuously record at all times when in flight, or when power to the aircraft is applied, and sufficient memory can be put in place inside the RFRS aircraft portion 100 to store an entire flight's worth of audio and video. For example, recording of low motion rank video for 12 hours with low loss compression may take as little as 8 gigabytes of memory, which is easily provided for with modern flash or other nonvolatile memory in the aircraft RFRS 100. This video may be optionally linked to the ground portion of the RFRS 120 via the satellite link, represented by a satellite 112 and links 111,113, at anytime or dumped in reverse time order (that is, the most recent first) upon a signaling of a possible emergency. In this manner transmission may be controlled to prioritize the events leading up to the emergency condition being firstly transmitted to the ground portion of the RFRS 120.

Optionally, the accelerometer and attitude and cabin barometric pressure sensors may be combined to indicate when the aircraft is taking off and climbing out, or landing, which is when emergencies and incidents occur most often, and the system programmed to only record, or only record and transmit, or only transmit during those periods.

Many combinations of sensor readings, thresholds, including sounds and images, may be combined in a program on the supervisory means of the RFRS in the aircraft 100, which can be conceived by those practiced in the art of aircraft emergencies and systems, without departing from the scope.

When audio and video from the RFRS aircraft portion 100 is received by the ground portion 120 via the satellite link (see e.g., satellite 112 and links 111,113), it can be stored and optionally analyzed immediately by either an automated artificial intelligence system contained within a component 115 (which, for example, may be a computer connected to receive information from the aircraft portion 100 of the RFRS via the satellite transceiver 114), or by a human trained to assist pilots in emergencies (not shown). If an aircraft is in a detected or declared emergency situation, the artificial intelligence function or the human may employ the satellite link and the speaker in the aircraft in order to provide advisement to the pilots, when appropriate.

In addition, the RFRS may provide for distribution of video and audio from an aircraft to authorities, or flight operations departments of airlines, or any other particular entity or machine which has a need to receive such information, or any combination thereof.

For example, had this RFRS system been in place on Air France 447 over the middle of the Atlantic, the aircraft portion sensors could have detected an attitude and acceleration of the aircraft which were unusual and commenced immediately sending video and audio of the cockpit conditions to Air France flight operations in Paris via the satellite link. The flight operations personnel in Paris, being more objective because they were not present in the cockpit, could have easily seen the multiple instrument panel indicators suggesting that the aircraft was in a stall condition, and could have observed that the pilots were taking the wrong approach to bring the aircraft out of stall, and could have communicated over the satellite link directly into the aircraft flight deck without requiring relay through multiple ground controllers and unknown ground-to-aircraft communications conditions, and possibly saved the aircraft. Even if the attempts to save the aircraft and passengers was ultimately unsuccessful, at the very least the flight operations personnel would have immediate knowledge of the reasons the aircraft went down, instead of having to wait nearly two years for the flight recorders to be found.

Embodiments of the invention also include aircraft that are configured with the camera 102 and/or components of the system for detecting activity within the aircraft (individuals within the cockpit cabin or other space, smoke, and the like), and of the aircraft (movements of the aircraft, which for example may include altitude, speed, and other detectable movements). The system preferably is deployed in the aircraft separate from other instrumentation of the aircraft itself. The camera 102, microphone, speaker, or other component of the system (including other sensors), may be provided separate from other components of the aircraft, such as the aircraft instrumentation that measure what the system sensors also may measure. The system may be implemented in the aircraft by connecting the system power to a power source of the aircraft, such as, for example, a generator, battery, power terminal or other source. The system may receive power directly from the aircraft power source, or system may be configured with its own power source, such as a rechargeable battery, or a combination of these, where the aircraft power source charges the system battery. However, according to preferred embodiments, the system ascertains information (e.g., such as activity within the aircraft cabin or cockpit, operating conditions, such as, altitude, speed, and others), which is sensed by the system components, and not the aircraft instrumentation. Although the aircraft is configured with instrumentation and sensors that may provide indications on the instrument panel in the cockpit, the RFRS system components are separate from the aircraft instrumentation, and the RFRS system ascertains information using these separately provisioned system components to communicate the info illation to a location remote from the operating aircraft. The aircraft preferably is configured, as illustrated in FIG. 1, to carry the system transceiver 109 and an antenna 110 which are configured with the communications mechanism of the system and sensors (such as the camera 102), to provide the information to a ground portion 120 of the system through a satellite communications link (see e.g., 112 and 111,113). The aircraft may be configured so that the system components that are employed to sense activity are located in different positions within panels of aircrafts, in order to make it more difficult for a wrongdoer to potentially disable the component. For example, a camera lens may be placed and disguised within a particular instrument panel, light, knob, or switch in one aircraft, and in a different location in another aircraft. According to some preferred embodiments, the system components are installed on the aircraft when it is being constructed. According to some other embodiments, the system is installed in an already constructed aircraft.

The system, method and devices also provide a service that a subscriber may receive. Embodiments of the invention are designed to provide a subscriber system for receiving the ascertained information, where the information for one or more aircraft may be managed among one or more subscribers. For example, the service may be implemented with the system, and information may be communicated to reside in a subscriber account. For example, a portion of the system may comprise one or more computing components, data repositories, or other storage means, which receives the information communicated from the aircraft portion of the system. For example, images from the camera 102 taken periodically (or streaming, or both periodic and streaming when activity or other triggering condition is present or detected) may be transmitted to the remotely situated ground portion of the system. The ground portion may be configured to capture the data from transmissions received from the aircraft portion, and process that information. According to some embodiments, the system is configured as a subscriber system, and subscribers may subscribe to receive access to the information provided by the system, even as the aircraft is in flight. The subscriber side of the system preferably resides in a ground portion of the system which subscribers (who are authorized) may access. The information may be subscribed to, and, the subscriber system may also include an alerting system that is configured to provide notifications to a subscriber. For example, according to one implementation, subscriber notification parameters may be preset (by a subscriber preference or otherwise) to provide an alert to a subscriber upon the subscriber account receiving information from the system of an aircraft that indicates a triggering event has occurred or been detected. A subscriber may subscribe to one or more subscription components, such as aircrafts, carriers, regions, or other distinction, so that the subscriber receives information relevant to particular aircrafts of interest to that subscriber. The subscriber may be provided with approvals and authorizations prior to the subscriber being permitted to access the information. Subscriber communications also may be encrypted. Other subscription requirements may be an account, a contact, a payment system for the subscriber to purchase or maintain a subscription. Among those who may be potential subscribers include for example an aviation authority or agency of a government, law enforcement, military, or other regulatory body or group. The subscriber system may be configured on a computing component, which may comprise a computer with a processor, and a storage component maintained on or in association with the computing component, so that information may be stored and retrieved from the storage component. The storage component may be a hard drive, flash memory, a drive of the computer, a remotely linked drive or other suitable data storage element. The subscriber system computer, for example, may be configured with software containing instructions to process the information from the aircraft portion of the system. The subscriber system computer, for example, may be configured to store and distribute the aircraft information obtained from the aircraft system portion, such as, for example, recordings, to appropriate flight operations people, trainers, authorities, and the like. These organizations or individuals may be subscribers. Subscribers also may be provided with different access levels, so that some subscribers may have access to different information than other subscribers (based on company affiliation, subscriber employment, rank or position level within an organization, and the like). The subscription may be set up as a service, provided and invoiced monthly, annually, or other remuneration method.

These and other advantages may be obtained through the use of the inventive system, methods and devices disclosed herein. While the invention has been described with reference to specific embodiments, the description is illustrative and is not to be construed as limiting the scope of the invention. For example, the percepting components may comprise or more cameras, and multiple sensors, and may be provided in different locations of the aircraft. The configuration may provide redundancy of sensors or alternate locations for viewpoint locations, and the like. Various modifications and changes may occur to those skilled in the art without departing from the spirit and scope of the invention described herein and as set forth in the appended claims.

What is claimed is:

1. A flight recorder system for real-time monitoring an aircraft, wherein said system is separate from the aircraft's own avionics, the system comprising:

(a) at least one percepting component for ascertaining a condition of an aircraft, the percepting component comprising one or more sensors for sensing a condition;

(b) wherein the percepting component is situated at a location on or within the aircraft from which information may be ascertained;

(c) a communication mechanism connected with said percepting component for transmitting and/or receiving communications over a communications network; and (d) a control mechanism connected with said percepting component to receive information from the percepting component and to communicate the information via the communication mechanism;

wherein said at least one or more sensors comprises a barometric pressure sensor, an accelerometer sensor, and an altitude sensor, and wherein said one or more sensors are independent from the aircraft's avionics and guidance components;

wherein said one or more sensors are configured to detect an emergency condition experienced by the aircraft;

wherein the aircraft being monitored has a cockpit, wherein the system includes a speaker situated within the aircraft cockpit, and wherein said system is configured to issue an alert via said speaker, when the system detects an emergency condition;

wherein said accelerometer sensor, said attitude sensor and said barometric pressure sensor are combined and provide an indication of when the aircraft is taking off and climbing out, or landing, and wherein the system programmed to only record, or only to record and transmit, during those periods when said aircraft is taking off and climbing out, or landing.

2. The system of claim 1, wherein the aircraft being monitored has an instrument panel in the cockpit, and wherein the system includes one or more cameras situated in the cockpit, wherein at least one of said one or more cameras is positioned to record the instrument panel of the aircraft.

3. The system of claim 1, further including a remotely situated ground operations portion configured to receive transmissions that include a monitored condition of the aircraft that includes at least an indication of when the aircraft is taking off and climbing out, or landing, said indication being provided by said accelerometer, said attitude sensor and said barometric pressure sensor.

4. The system of claim 3, wherein said communications network comprises a satellite communications link, wherein said percepting components are provided on the aircraft and comprises an aircraft portion of said system, said aircraft portion including said communication mechanism and a satellite radio transceiver and an antenna for radiating signals for communicating via said communications network satellite communications link with said ground operations portion; wherein said ground operations portion comprises a receiving component configured to receive communications transmitted from the communication mechanism of the aircraft portion; and wherein said aircraft portion communicates with said ground operations portion via said satellite communications link.

5. The system of claim 4, wherein the aircraft being monitored has an instrument panel in the cockpit, and wherein the system includes one or more cameras situated in the cockpit, and wherein said one or more cameras includes a capture element that is installed within an aircraft cockpit component, and wherein the capture element is disguised to integrate with the cockpit component.

6. The system of claim 4, wherein the ground operations portion computer software is configured with instructions to
   a) process the information and store the information received from the aircraft portion;
   b) identify a subscriber;
   c) associate the subscriber with an access provision; and
   d) provide access to aircraft information to the subscriber based on the subscriber access provision.

7. The system of claim 6, including an option for the subscriber to designate an aircraft, or category in which one or more aircrafts are classified; and wherein the system generates alerts, including a subscriber alert that is communicated to a subscriber of a designated aircraft or category to which one or more aircrafts are classified, based on a trigger generated from the processing of information communicated from the aircraft portion.

8. The system of claim 4,
   wherein the ground operations portion includes a computer with a processing component and software configured with instructions to instruct the processing component to analyze the information communicated from the aircraft portion by comparing the information to one or more threshold or predetermined values;
   wherein said system is configured to generate a response when a threshold value or predetermined value is detected;
   wherein said response comprises a communication to said aircraft cockpit;
   wherein said response is communicated through one or more components of the aircraft portion of the system;
   wherein said response is communicated via said ground operations portion satellite transceiver through the satellite communications link to said aircraft portion transceiver through said aircraft portion antenna;
   wherein the control mechanism comprises one or more of a computing component or control circuitry means;
   wherein said response is communicated to said computing component or control circuitry means;
   wherein said computing component or control circuitry means of said aircraft portion is configured to process said response received from said ground operations portion and issue an alert via said one or more components of said aircraft portion;
   wherein said ground operations portion comprises an artificial intelligence system configured to detect conditions of the aircraft from the communications providing information obtained by the percepting component of the aircraft portion of the system, wherein said conditions include unusual conditions detected by said accelerometer and said attitude sensor of said system.

9. The system of claim 8, wherein the aircraft being monitored has an instrument panel in the cockpit, and wherein the system includes one or more cameras situated in the cockpit, and wherein said one or more cameras includes a capture element that is installed within an aircraft cockpit component, and wherein the capture element is disguised to integrate with the cockpit component.

10. The system of claim 8, wherein said unusual conditions are communicated to the aircraft cockpit via said ground operations portion satellite transceiver through said satellite communications link to said aircraft portion transceiver through said aircraft portion antenna.

11. The system of claim 10, wherein said communication of said unusual conditions comprises an audible communication through said speaker.

12. The system of claim 11, wherein said communications take place via satellite communications between said ground operations portion and said aircraft to deliver the message through the cockpit speaker.

13. The system of claim 12, wherein said system is configured to determine via said sensors that are independent of said aircraft avionics, when an aircraft is in a detected or declared emergency situation, and wherein said system is configured with an artificial intelligence function that employs the satellite communications link and the cockpit speaker in order to provide advisement to the pilots.

14. The system of claim 12, wherein said system is configured to determine via said sensors that are independent of said aircraft avionics, when an aircraft is in a detected or declared emergency situation, and wherein said system is configured with a function that allows a human to selectively employ the satellite communications link and the cockpit speaker in order to provide advisement to the pilots.

15. The system of claim 10, wherein the aircraft being monitored has an instrument panel in the cockpit, and wherein the system includes one or more cameras situated in the cockpit, wherein at least one of said one or more cameras is positioned to record the instrument panel of the aircraft.

16. The system of claim 15, wherein said one or more cameras includes a capture element that is installed within an aircraft cockpit component, and wherein the capture element is disguised to integrate with the cockpit component.

17. The system of claim 11, wherein the aircraft being monitored has and an instrument panel in the cockpit, and wherein the system includes one or more cameras situated in the cockpit, wherein at least one of said one or more cameras is positioned to record the instrument panel of the aircraft.

18. The system of claim 17, wherein a threshold value or threshold change in a value for one or more conditions sensed by said one or more sensors is designated, and wherein information from the sensors is monitored and processed to determine whether a threshold value or change in value has been met, and wherein when the threshold value or change in value has been met, said one or more cameras is actuated to record images.

* * * * *